No. 737,028. PATENTED AUG. 25, 1903.
F. W. SEIDL.
HARVESTER ATTACHMENT.
APPLICATION FILED DEC. 8, 1902.
NO MODEL.
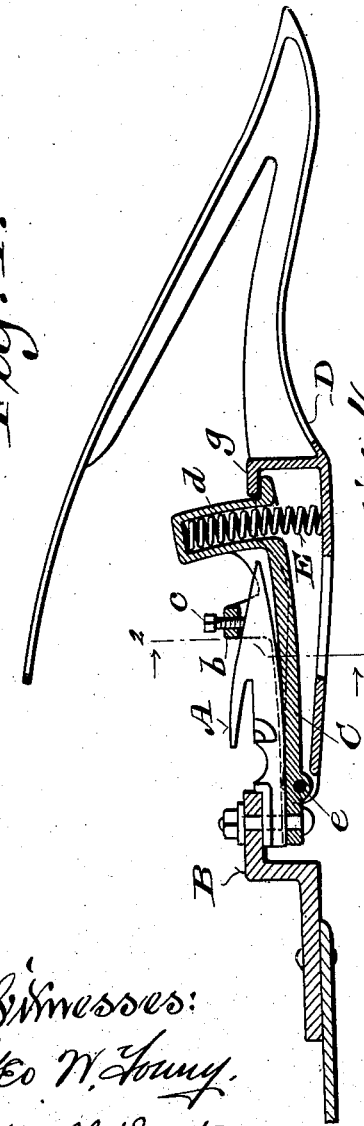
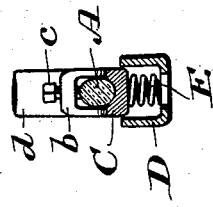
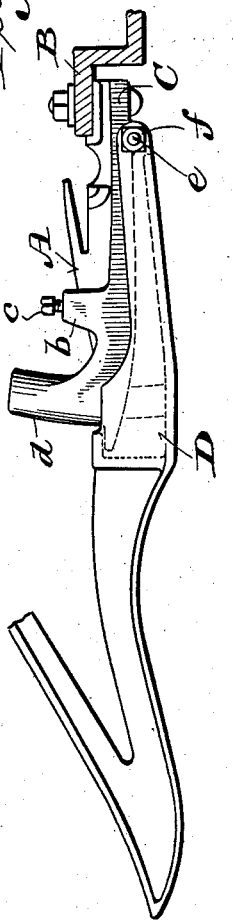
Witnesses:
Geo. W. Young.
H. E. Oliphant.
Inventor:
Frank W. Seidl.
By H. G. Underwood
Attorney No. 737,028. Patented August 25, 1903.

UNITED STATES PATENT OFFICE.

FRANK W. SEIDL, OF MANITOWOC, WISCONSIN.

HARVESTER ATTACHMENT.

SPECIFICATION forming part of Letters Patent No. 737,028, dated August 25, 1903.

Application filed December 8, 1902. Serial No. 134,321. (No model.)

*To all whom it may concern:*

Be it known that I, FRANK W. SEIDL, a citizen of the United States, and a resident of Manitowoc, in the county of Manitowoc and State of Wisconsin, have invented certain new and useful Improvements in Harvester Attachments; and I do hereby declare that the following is a full, clear, and exact description thereof.

My invention has for its object to provide simple, economical, and durable attachments readily applicable to knife-guard fingers and finger-bars of harvesters to serve as means for raising lodged grain or other material to be cut, said invention consisting in certain advantageous peculiarities of construction and combination of parts hereinafter particularly set forth with reference to the accompanying drawings and subsequently claimed.

Figure 1 of the drawings represents a partly vertical longitudinal section of an attachment in accordance with my invention connected to a knife-guard finger and finger-bar of a harvester; Fig. 2, a sectional view indicated by line 2 2 in the first figure; Fig. 3, a side elevation of the attachment, the finger-bar to which it is connected being shown in section; and Figs. 4 and 5 plan views of shank and runner parts of said attachment, the latter of these two figures being partly in horizontal section.

Referring by letter to the drawings, A indicates a knife-guard finger, and B the finger-bar of a harvester. Superimposed by the finger A and bolted therewith to the bar B is the shank C of the attachment herein set forth, the forward portion of said finger being under a bail *b* of said shank in opposition to a set-screw *c*, adjustable in the bail, the latter being in one piece with the aforesaid shank. Forward of its bail *b* the shank C of the attachment is provided with an upwardly-extending rearwardly-inclined socket *d*, the opening to this socket being at its lower end.

The runner D of the attachment has a channeled rear end engaged by the shank C, to which it is detachably connected by a pivot-bolt *e*, having a nut *f* run thereon, the pivot-joint being at the rear extremity of said runner. Engaging socket *d* of the shank C to be under tension against the runner D is a spiral spring E, and the forward end of said shank opposes a lip *g* of said runner to limit downward play of the latter.

In practice the runner has limited upward yield to obstructions of more than ordinary resistance in its path, and the spring opposing upward play of said runner is incased, so that it cannot become clogged or automatically displaced, this being an important feature of advantage pertaining to said attachment. The length and tension of the spring are such that there is practically constant vibration of the runner portion of the attachment ahead of the cutting apparatus of the harvester to thereby facilitate loosening and lifting of lodged grain or other material to be cut.

Having thus described my invention, what I claim as new, and desire to secure by Letters Patent, is—

An attachment consisting of a shank attachable to a knife-guard finger and the finger-bar of a harvester and provided with a forward upwardly-extending socket, a runner having a channeled portion engaged by the shank to which its rear extremity is pivotally connected, a spiral spring engaging said socket under tension against the runner, and a lip constituting part of said runner arranged to overlap the forward end of said shank.

In testimony that I claim the foregoing I have hereunto set my hand, at Manitowoc, in the county of Manitowoc and State of Wisconsin, in the presence of two witnesses.

FRANK W. SEIDL.

Witnesses:
 NICHOLAS DEDRICK,
 HENRY MEANY.